(12) United States Patent
Tevosyan et al.

(10) Patent No.: US 10,097,631 B2
(45) Date of Patent: Oct. 9, 2018

(54) SYNCHRONIZING CONVERSATION THREADS CORRESPONDING TO A COMMON CONTENT ITEM

(71) Applicant: Facebook, Inc., Menlo Park, CA (US)

(72) Inventors: Ashoat Tevosyan, New York, NY (US); Holly Marie Ormseth, San Francisco, CA (US); Amy Mercy Hwang, San Jose, CA (US); Varun Vikram Bhartia, San Francisco, CA (US); Alan Grant McConnell, Daly City, CA (US); Todd Michael Hamilton, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 275 days.

(21) Appl. No.: 14/802,232

(22) Filed: Jul. 17, 2015

(65) Prior Publication Data

US 2017/0019474 A1    Jan. 19, 2017

(51) Int. Cl.
*H04L 29/08* (2006.01)
*H04L 12/58* (2006.01)

(52) U.S. Cl.
CPC .......... *H04L 67/1095* (2013.01); *H04L 51/16* (2013.01); *H04L 51/32* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2012/0317309 A1* | 12/2012 | Benco | H04L 67/1095 709/248 |
| 2015/0135097 A1* | 5/2015 | Carriero | G06F 17/3089 715/753 |
| 2016/0142358 A1* | 5/2016 | Zunger | G06Q 10/107 709/206 |

* cited by examiner

*Primary Examiner* — Kevin Bates
*Assistant Examiner* — Lesa Kennedy
(74) *Attorney, Agent, or Firm* — Baker Botts L.L.P.

(57) ABSTRACT

In one embodiment, a method includes receiving a first document including at least one content item and an interactive feature which allows users to post comments or additional content in response to the content item. The first document is associated with at least one entity, and is provided from a first web domain. A second document is selected from a second web domain, where the second document has a common content item with the first document, is also associated with the entity, and has its own interactive feature for user posts. A user post is received in connection with the first document, and the interactive features of the first document and the second document are synchronized so that the user post appears in both documents at substantially the same time.

20 Claims, 8 Drawing Sheets

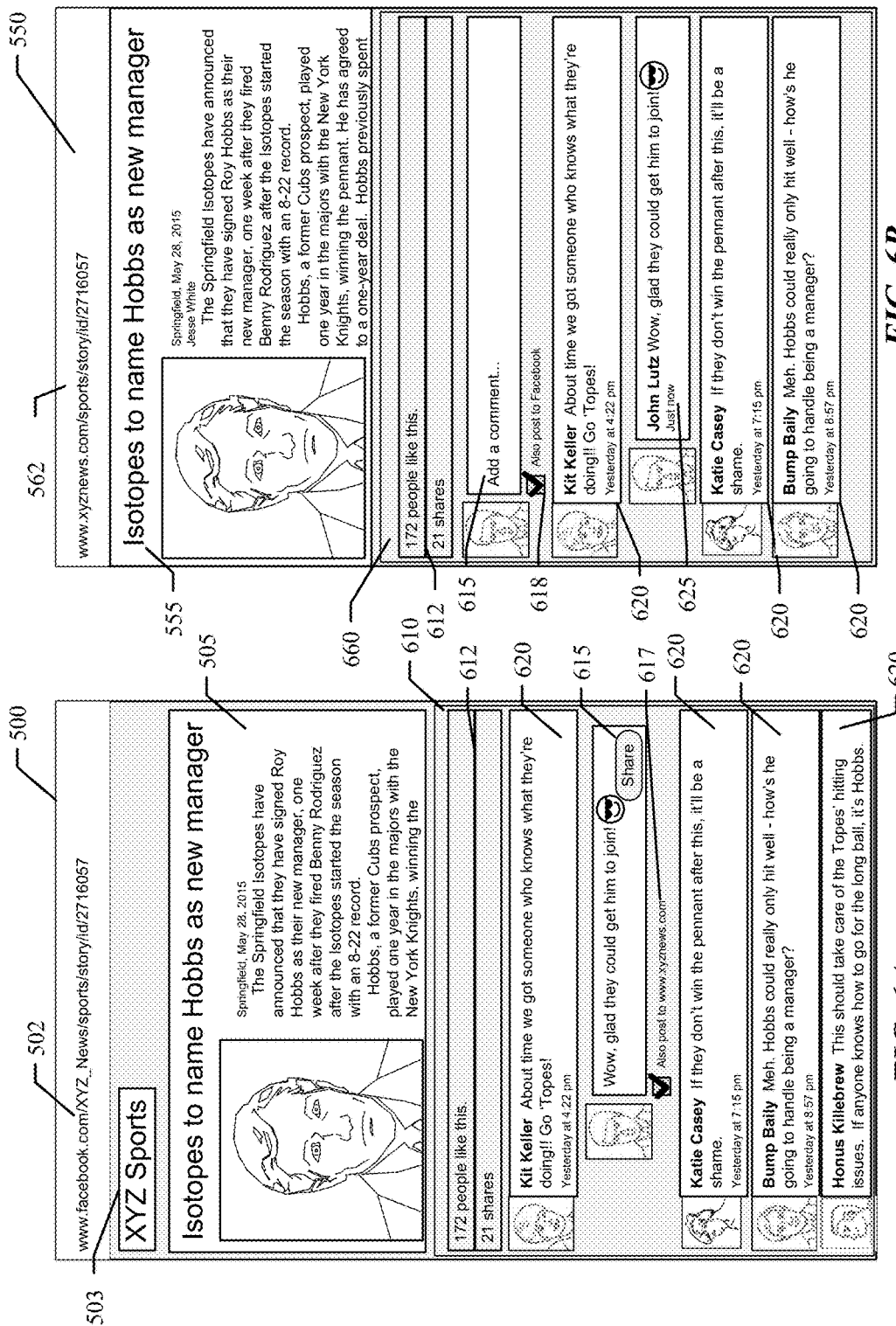

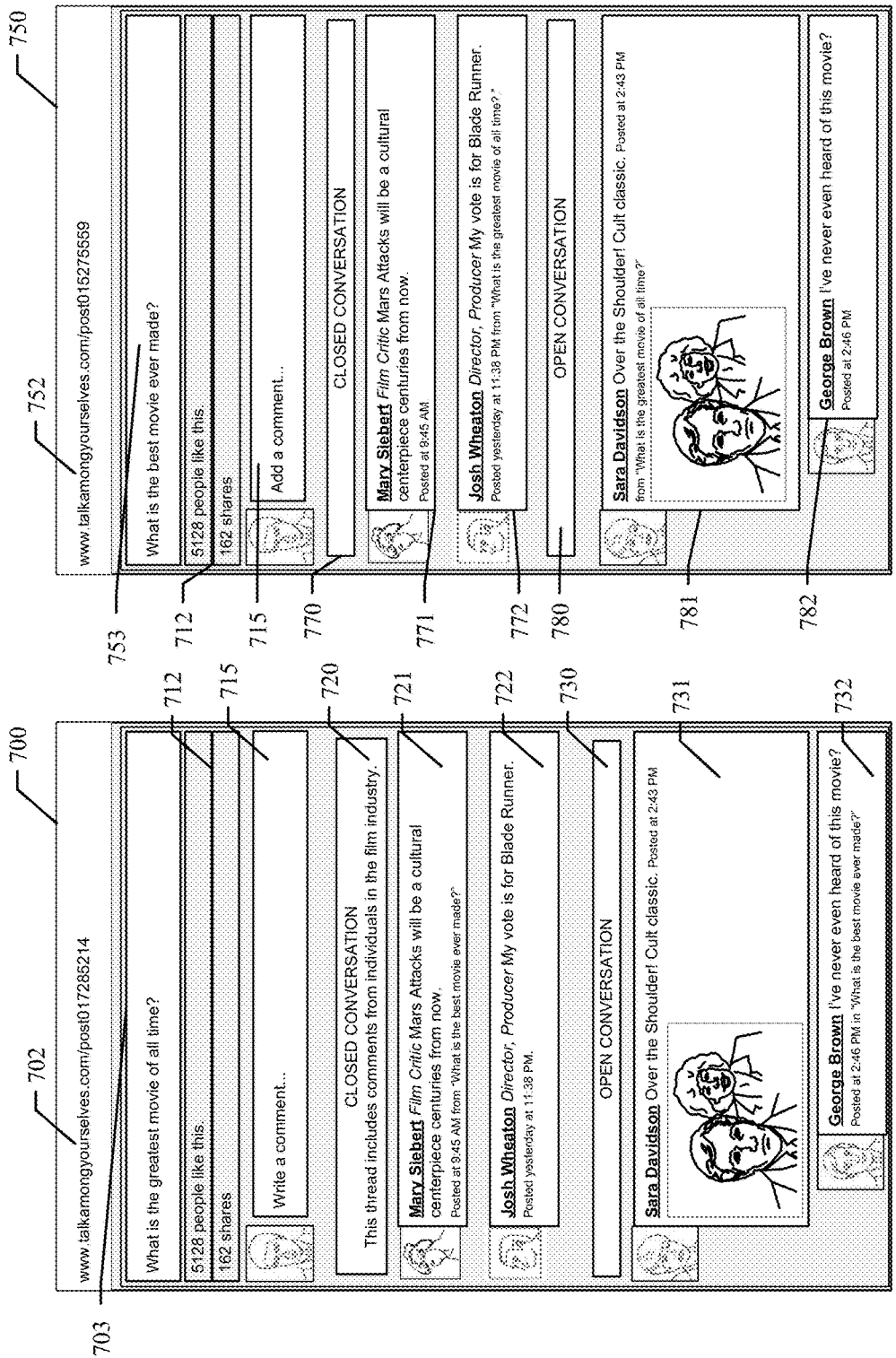

SYNCHRONIZING CONVERSATION THREADS CORRESPONDING TO A COMMON CONTENT ITEM

TECHNICAL FIELD

This disclosure generally relates to facilitating interactions on social media interfaces on a variety of computing applications and websites.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Interactive features of a document displayed on a computing device may permit a user viewing the document to use social-networking features in consuming the document. For example, users viewing a video file may post comments on a web page or other user interface displaying the video file. As users comment on the video file and reply to previous comments made, the interactive features may represent a conversation thread between the commenting users. In particular embodiments, a document may be on a web domain of a social-networking system, and users who wish to provide comments or otherwise interact with the document may use their access to the social-networking system to post comments and have those comments be seen by their friends or connections on the social-networking system. In particular embodiments, if a document is posted in a web domain that is outside the social-networking system, such as a third-party news website, users may still use their social-networking system credentials in a plugin or widget on the third-party news website which enables interaction through the social-networking system on the third-party web domain. In some instances, the same document or content item may be posted on multiple locations, such as both a web page of the social-networking system, as well as a web page on an external website. Synchronizing the interactive features for the document or content item at all of the multiple locations may allow a single conversation thread to be in place for the document or content item.

In particular embodiments, synchronizing the interactive features may include identifying an entity that is associated with a first document or content item. Examples of an entity may include the creator of the content item, a publisher of the content item, or the entity or user who posted or shared a particular document or content item to a particular location. Once an entity is identified, the social-networking system may determine one or more other locations or web domains that are also associated with the entity. As an example, an entity that creates and publishes media content may be associated with multiple web domains where their content is published. The social-networking system may select one or more second documents to synchronize with the first document. This selection may be done by comparing unique identifying information of the two or more documents, or unique identifying information of the two or more media content. In particular embodiments, once at least one second document is identified, the interactive features of the first and second documents may be synchronized. In particular embodiments, the social-networking system may receive a user post or comment at one of the documents. The social-networking system may then propagate the user post or comment throughout all of the corresponding documents, so that all of the user posts or comments regarding the document or content item, regardless of the source of each user post or comments. In particular embodiments, a user may send a reply to a posted comment on the conversation thread. The reply may also be synchronized with all comments, so that the reply will appear next to the original comment at all locations.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5A illustrates an example user interface for interactive features of a document on a web page of a social-networking system.

FIG. 5B illustrates an example user interface for interactive features of a document on a web page external to a social-networking system.

FIGS. 6A and 6B illustrates an example of synchronized interactive features across two documents on two separate web domains.

FIGS. 7A and 7B illustrates an example of synchronized interactive features across two documents on two separate web domains.

DESCRIPTION OF EXAMPLE EMBODIMENTS

System Overview

Figure 1:
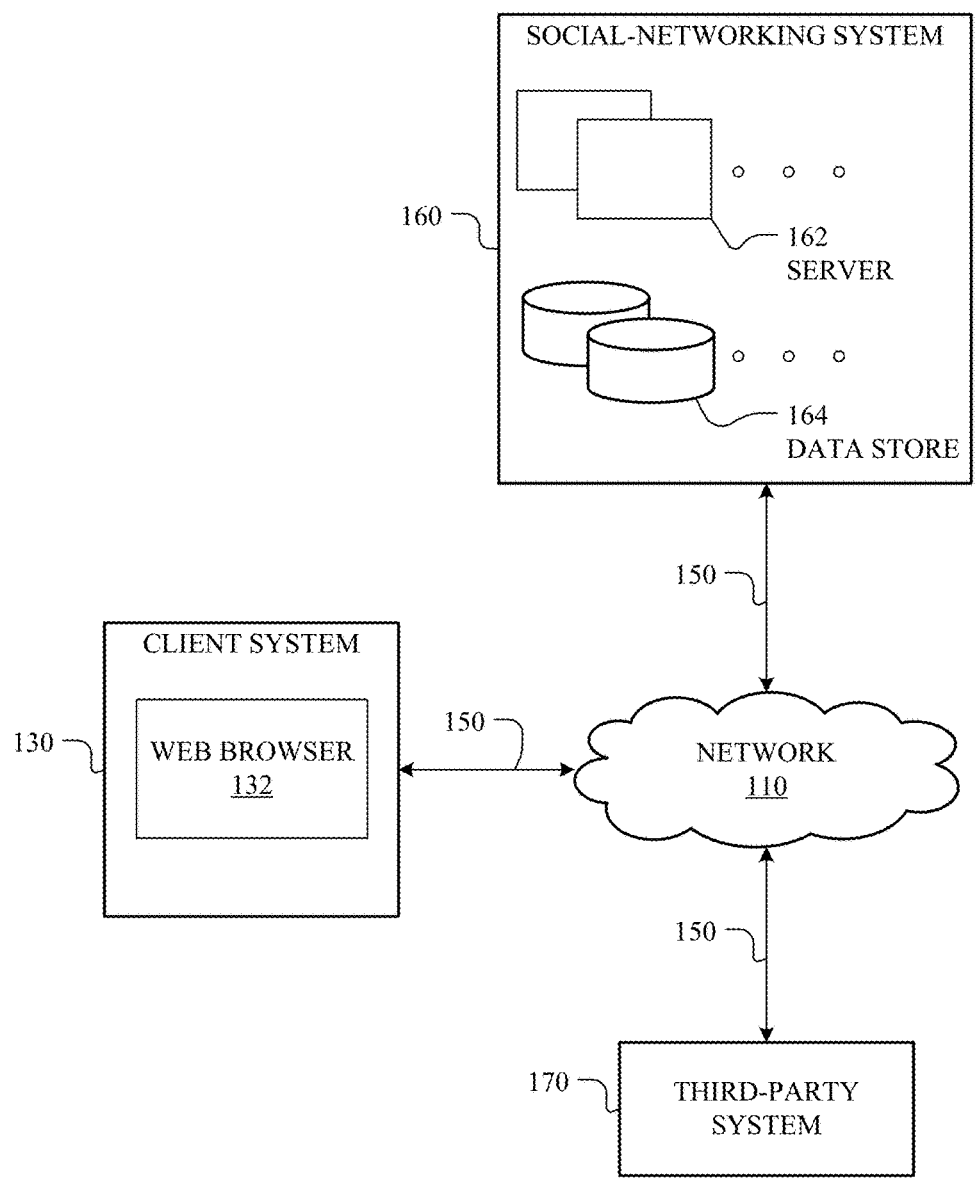
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
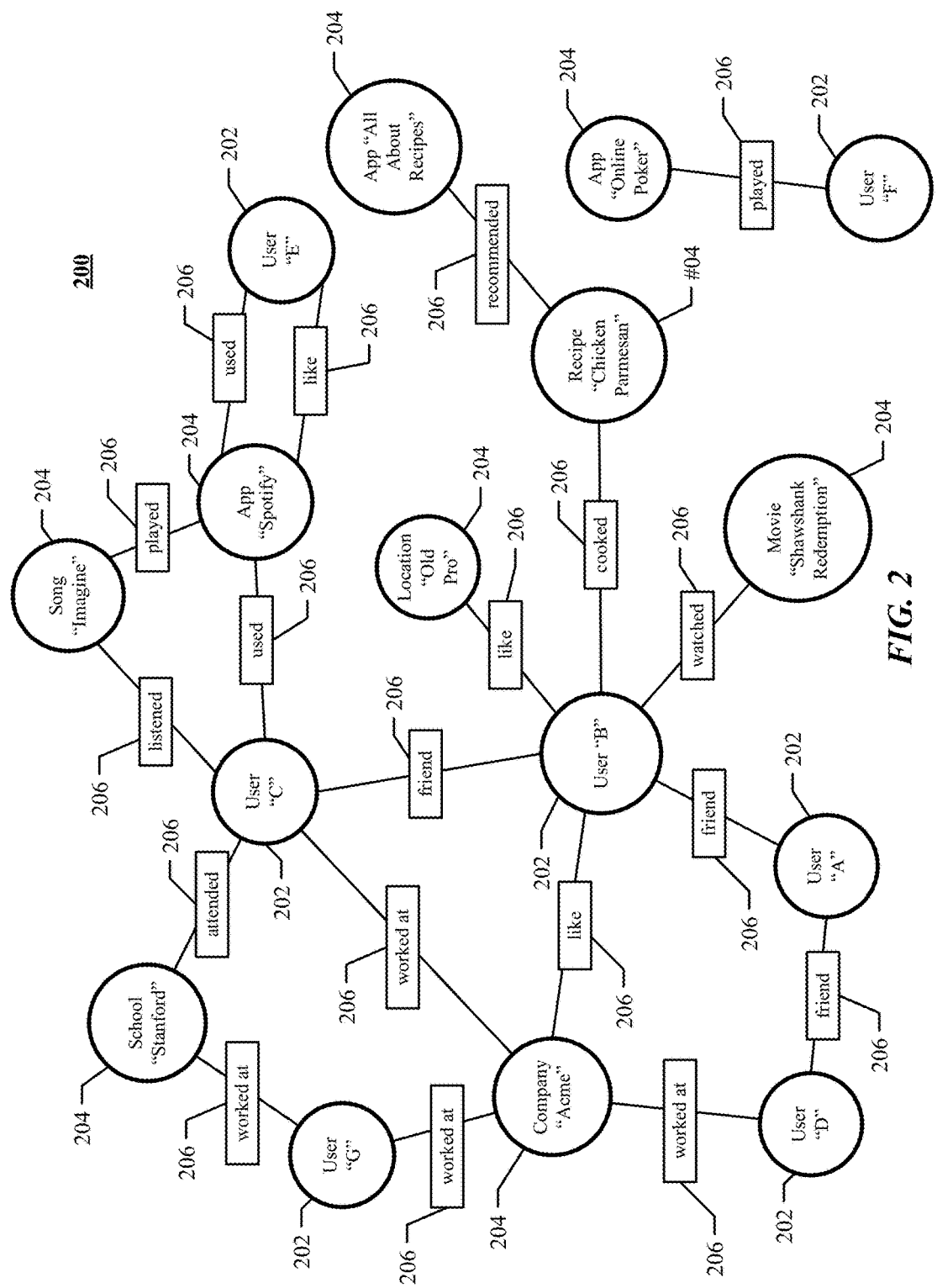
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Comments Plugin Synchronization

In particular embodiments, a user of social-networking system 160 may view one or more documents hosted on a web domain of social-networking system 160. As an example and not by way of limitation, a user may view a web page containing text or media content, such as a story, a video, an image, an audio file, a message, or any other suitable content that can be displayed to the user. In particular embodiments, the user may alternatively view a document that is hosted by a web domain external to social-networking system 160. As an example and not by way of limitation, a user may view a video that is hosted on a third-party website, such as a news website. In particular embodiments, a document viewed by a user may comprise a single content item, or may comprise multiple content items.

In particular embodiments, a document may further comprise one or more interactive features which may permit a user to interact with the document or a content item of the document. As an example and not by way of limitation, a user may "like" the document; the user may share or re-post the document, for example on a personal social-networking page; or the user may post a comment on the document, which may include text and/or media content. In particular embodiments, the document may feature a section where the interactive features for the document are displayed, with elements that the user may interact with to perform each interaction. In particular embodiments, the interactive features which relate to social-networking system 160 may be provided on an external website, e.g. a website that is not directly associated with social-networking system 160. As an example and not by way of limitation, an external web page may include a widget, a plugin, or any other means for including features of another web domain such as social-networking system 160 within the external web page. This may allow a user to log in using their credentials on social-networking system 160 to post comments on the external website, without logging in separately at a web page of social-networking system 160. In particular embodiments, the interactive features section may further comprise a display of other interactions previously performed by the user and/or other users. As an example and not by way of limitation, the interactive features section may include a counter indicating the number of users who have "liked" or shared the document, and may also include a conversation thread displaying comments previously posted by other users. In particular embodiments, the counter indicating a number of users who have "liked" or shared the document may itself be interactive, such that if the user clicks on the counter, the user may view the list of other users who have "liked" or shared the document.

In particular embodiments, the comments displayed in the interactive features section may be displayed as a conversation thread, with the comments arranged in chronological order. In particular embodiments, the conversation thread may be arranged such that comments made by other users with high affinity to the user (such as a friend of the user on social-networking system 160) are displayed first. In particular embodiments, interacting with a particular comment in the conversation thread may allow a user to respond directly to the particular comment. The response comment may then be displayed in the conversation thread in proximity to the particular comment, so that it would be understood that the response comment was written in response to the particular comment. In particular embodiments, other users may further interact with the response comment to provide further responses, which may also be displayed in proximity to the first response comment as well as the particular comment.

In particular embodiments, a user comment may comprise one or more of text, images, links, video, audio, stickers, ideograms (e.g. emoticons or emoji), or any other suitable content that may be input by one user and presented to other users. In particular embodiments, a link posted by a user may comprise a link to another comment thread or conversation thread, which may be part of another document or content item. As an example and not by way of limitation, a user may comment on an interactive feature provided for a music file with a link to a conversation thread corresponding to a similar music file. If another user selects the link, that other user may be presented with the similar music file and the corresponding conversation thread. In particular embodiments, a document provided by a web domain of social-networking system 160 may comprise one or more content items which are provided by a third-party entity, where the document is associated with a page of social-networking system 160 that corresponds to the third-party entity. As an example and not by way of limitation, a third-party entity, XYZ News, may be a news organization that provides domestic and international news. XYZ News may publish its news articles on its own web domain, www.xyznews.com. A user wishing to read a news article from XYZ News may be able to go to www.xyznews.com to access the news article. In particular embodiments, XYZ News may have a page on social-networking system 160 that is a page dedicated to content items posted by XYZ News. In particular embodiments, a news article that is accessible on www.xyznews.com may also be accessible on the XYZ News page on social-networking system 160. In this embodiment, a user has the option of going to either the www.xyznews.com website, or a website corresponding to the XYZ News page on social-networking system 160, to access the news article. As another example and not by way of limitation, a page of social-networking system 160 may correspond to a third-party entity Majestic Cat Videos, which may post video content items on the page. This entity may also post the same video content items on a website external to social-networking system 160, such as www.xyznews.com/majesticcatvideos/. As seen in this example, the web domain of the external web site need not correspond to the entity. In particular embodiments, there may be multiple locations where the same content may be posted by the third-party entity. Continuing the previous example, third-party entity Majestic Cat Videos may also post video content items on additional pages of social-networking system 160, such as a page titled "Trendy Vids." Majestic Cat Videos may also post video content items on additional external websites in addition to the example above, such as www.metube.com/majesticcatvideos, or any video publishing and distribution website.

In particular embodiments, the external web page may also contain interactive features associated with social-networking system 160. As an example and not by way of limitation, the same set of interactive features that may be available to users on the Majestic Cat Videos page of social-networking system 160 may be available to users on a document provided through www.xyznews.com/majesticcatvideos/. In both locations, a user may like or share the content item in the document, or post a comment regarding the content item or document.

In particular embodiments, the interactive features provided on a document of a first web domain may be synchronized with interactive features provided on a document provided through a second web domain. In particular embodiments, synchronizing interactive features may include synchronizing the substantive content of comments posted by users in each interactive feature. As an example and not by way of limitation, a user may post a comment on a news article posted on the XYZ News page of social-networking system 160. The comment may appear in a conversation thread on the article on the XYZ News page. The comment may also appear in the conversation thread on the same article, but on the external XYZ News website (e.g. at www.xyznews.com). In particular embodiments, other users may be able to see the user comment and interact with the user comment at both locations. In particular embodiments, interactive features on multiple documents may all be synchronized, regardless of location. As an example and not by way of limitation, the news article posted on the external XYZ News website (which includes the interactive features of social-networking system 160) may also be posted on another external website, with interactive features enabled on the other external website as well. In this example, if a user comments on any of the three locations where the news article has been posted, the comment may be displayed on the conversation threads for all three locations. In particular embodiments, the synchronization of the conversation threads would happen substantially in real time. As an example and not by way of limitation, if a user posts a comment in a first location (e.g. on a social network page), social-networking system 160 will also display the comment at a second location at the same time social-networking system 160 displays the comment at the first location. By synchronizing the various conversation threads so that each of the multiple locations presents virtually a single conversation thread, a user viewing the document or content item at any of the locations may have access to the entire public conversation regarding the document or content item, which may improve the overall experience of viewing and interacting with user comments.

In particular embodiments, synchronizing interactive features may include other user interactions, such as likes or shares. As an example and not by way of limitation, if five users share a particular content item on a first document at a first web domain, and three users share the same content item on a second document at a second web domain, the interactive features for both the first document and the second document may indicate a total of eight user shares for the content item. If another user interacts with the indication of the eight user shares on either the first document or the second document, a listing of the eight sharing users may be provided. In particular embodiments, the listing may further include an indication of from where (e.g. from which web domain) each of the users shared the content item.

In particular embodiments, the conversation threads associated with the same content item posted in multiple locations may be synchronized to be displayed in the same order at all locations. This may include placing replies to a previous comment in proximity to the previous comment to indicate that it is a reply. As an example and not by way of limitation, Content Item 1 may be posted in a page of social-networking system 160, and also at an external website, with comments enabled at both locations. User Alice may post a comment on the social-network page at 9:00 AM, while user Bob posts a comment on the external website at 9:02 AM. User Charlie may then post a comment on the social-network page at 9:05 AM, and user David may post a comment in response to Bob's comment (via the external website) at 9:08 AM. At both the social-network page and external website for Content Item 1, the conversation thread of user comments may be arranged so that Alice's comment appears first, followed by Bob's comment, then David's comment (which is a response to Bob's comment), followed by Charlie's comment. In this example, users at both locations would view the conversation thread in the same manner, and interact with comments in the same way. In particular embodiments, the conversation threads may omit any indication of where each user comment was posted from. As an example and not by way of limitation, in the example above, user Ellen may view the conversation thread for Content Item 1 on the social-network page, and see comments from Alice, Bob, David, and Charlie (in that order) without any indication that any of those comments came from outside the social-network page. In particular embodiments, the conversation thread may include an indication of the source of each user comment. Continuing the example above, when Ellen views the conversation thread, Bob's comment may include an indication that his comment came from the external website (as would David's in this example). In particular embodiments, the conversation thread may only include indications of the comment source if it is different than the location where the content item and conversation thread is being viewed. As an example and not by way of limitation, if Ellen is viewing Content Item 1 on the social-network page, the conversation thread may include indications for Bob's and David's comments. If Ellen is instead viewing Content Item 1 from the external website, the conversation thread may include indications that Alice's and Charlie's comments are not from the website.

In particular embodiments, a user's subsequent modifications to their own posts or user actions may be synchronized across multiple domains. As an example and not by way of limitation, user Alice may post a first comment in a first document, which is then synchronized to a conversation thread of a second document. Subsequently, Alice may edit or delete her comment from either the first document or the second document. Social-networking system 160 may then determine that the same edits or deletion should be made at the other location than the location from which Alice is making the modification to her comment. In particular embodiments, social-networking system 160 may send Alice a notification that her edits or deletion may affect her comment at another location. In particular embodiments, social-networking system 160 may ask Alice to select whether she wishes to cancel her edits; whether she wishes to synchronize her comments and carry the edits to the other location; or only make her edits in the comment she is modifying, without synchronizing with the other location. In particular embodiments, if Alice chooses to only modify one of the comments, social-networking system 160 may stop synchronizing Alice's comments between the two conversation thread in the first and second documents. In particular embodiments, social-networking system 160 may still synchronize the conversation threads between the first and second documents, and ask Alice each time she enters an edit or posts a new comment whether she would want the comment to be synchronized at the other location.

In particular embodiments, the synchronization between the interactive features for a content item that is shared or posted on multiple web domains may include synchronization of any moderation tools that are implemented by an administrator or moderator at one of the web domains. As an example and not by way of limitation, for a particular website which posts content items, a moderator may monitor any comments posted on the website and delete or otherwise moderate any comments containing content or words deemed offensive. When this is done at one of the website, social-networking system 160 may carry the moderation over to the comments in the other corresponding web domains, so that the same comments are removed from the conversation threads at the other locations. In particular embodiments, linking the moderation of comments posted to social-networking system 160 to comments posted on external websites may shift the responsibilities of moderating all comments associated with a content item to the external moderator, regardless of a comment's origin. As an example and not by way of limitation, if a particular content item that is posted to social-networking system 160 and also to an external website is determined to have 10 offensive comments posted to the content item from users on social-networking system 160, and 10 offensive comments posted to the content item from users on the external website, a moderator of the external website may be able to view all 20 offensive comments, regardless of source, and determine that those comments should be deleted. In particular embodiments, the moderation of comments on an external website may be automated, for example based on a set of banned words or character strings. Any comment that includes a banned word or character string may be automatically filtered out of the conversation thread. In particular embodiments, basing the moderation rules for pages of social-networking system 160 on the moderation rules of a corresponding external website may result in the moderation rules for a particular page of social-networking system 160 being tailored for the intended user group of the page. As an example and not by way of limitation, Content Item 2 may be a video tailored for a general audience which is also posted to a website geared towards children, while Content Item 3 may be musical content that is rated for mature audiences, and is also posted to a website intended for adult listeners. Rather than social-networking system 160 developing separate moderation tools for comments for Content Item 2 versus Content Item 3, social-networking system 160 may link the moderation tools on the respective websites for the two content items. In this example, words or comments that may be filtered out for Content Item 2 may remain in the conversation thread for Content Item 3.

In particular embodiments, synchronization of interactive features may extend to additional posts of the same content item, whether the post was made by the original entity that published the content, or a third-party entity. As an example and not by way of limitation, a particular image may be posted as a first document on social-networking system 160 by a first entity called Sports Fans. Users may then submit comments to the first document regarding the particular image. Another entity, for example XYZ News, may re-post the same image on a second document of social-networking system 160 (such as the other entity's page on social-networking system 160). Social-networking system 160 may determine that although the posting entity in the second document is different, the content items are identical, and the first document and second document should be synchronized. In particular embodiments, determining whether the documents should be synchronized may be confirmed by checking whether the re-posting entity credits the first entity for the content item. Continuing this example, if XYZ News re-posts the particular image with a credit or H/T to Sports Fans, social-networking system 160 may use that information as a confirmation that the re-posted image is the same content as the image originally posted by Sports Fans, and that the documents should be synchronized.

In particular embodiments, a link included in a user comment may be to a separate conversation thread with no associated content item. As an example and not by way of limitation, a conversation thread may be started on social-networking system 160 or a third-party website based on a topic or prompt by one user, without a related content item. For example, a user of social-networking system 160 may post a status update asking her friends, "What was your favorite book growing up?" If other users then comment on the status update, the conversation thread that is created may itself be sent via a link in a comment. In particular embodiments, a conversation thread that was started on social-networking system 160 may be duplicated on a third-party web page that also allows conversations or web forums. Social-networking system 160 may determine that the conversation thread on social-networking system 160 corresponds to a conversation thread on the external web page, and determine that the two conversation threads should be synchronized.

Figure 3:
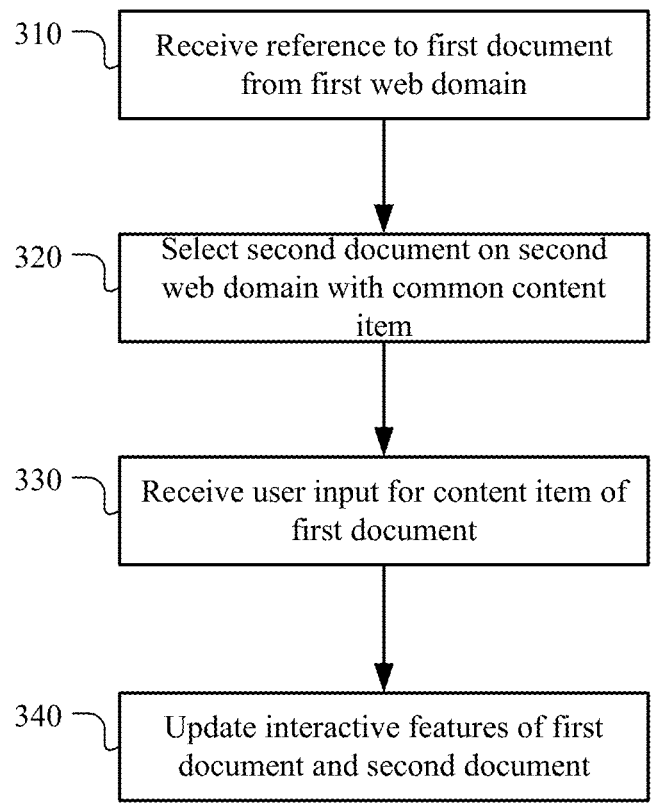
FIG. 3 illustrates an example method for synchronizing interactive features on two documents in two separate web domains.

FIG. 3 illustrates an example method 300 for synchronizing interactive social-networking features of multiple documents. The method may begin at step 310, where a reference to a first document provided by a first web domain is received. The first document may be associated with an entity defined by social-networking system 160. As an example and not by way of limitation, a first web domain may be a web domain corresponding to social-networking system 160; a web domain external to social-networking system 160; or a web domain corresponding to a mobile application. The first document may comprise a content item and a first interactive feature which allows user actions, such as likes, shares, or posts. In particular embodiments, the interactive feature may be presented as a conversation thread. In particular embodiments, the interactive feature may be linked to social-networking system 160 through a widget or a plugin on a web page. At step 320, a second document that corresponds to the first document may be selected. The second document may also be associated with at least one entity in common with the first document. In particular embodiments, the second document may be provided at a second web domain that is distinct from the first web domain. In particular embodiments, the determining may comprise determining that the second document shares a common content item with the first document. In particular embodiments, the second document may comprise a second interactive features for user actions. At step 330, a user action related to the content item may be received, wherein the user action is sent in connection with the first interactive feature. As an example and not by way of limitation, the user action may be a comment sent by a user in connection with the content item of the first document. At step 340, the first interactive feature and the second interactive feature may be updated with the user action. In particular embodiments, the updating may comprise synchronizing the first interactive feature and the second interactive feature substantially in real-time, by social-networking system 160.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for synchronizing two interactive features in two web domains including the particular steps of the method of FIG. 3, this disclosure contemplates any suitable method for synchronizing two interactive features including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, social-networking system 160 may select two or more documents which correspond to each other, so that the interactive features of the two or more documents may be synchronized. In particular embodiments, determining that two or more documents correspond to each other may be based on the domain name of an external website, and/or a page ID corresponding to a particular external web page. As an example and not by way of limitation, social-networking system 160 may determine that a document comprising a content item posted by XYZ News to the XYZ News page of social-networking system 160 corresponds to the XYZ News entity. Social-networking system 160 may also determine that the XYZ News entity also corresponds to the www.xyznews.com web domain, which has a number of documents which include interactive features for user actions. In particular embodiments, the document posted by XYZ News to the XYZ News page of social-networking system 160 may include a page ID for the document. Social-networking system 160 may determine whether any document in the www.xyznews.com web domain has a matching page ID. If there is a matching page ID, social-networking system 160 may determine that the two documents with matching page IDs should be synchronized.

In particular embodiments, social-networking system 160 may determine that a publishing entity which posts content on social-networking system 160 is associated with a subdomain of a discrete web domain. As an example and not by way of limitation, social-networking system 160 may determine that a particular content item was posted by the entity Majestic Cat Videos, which does not have a discrete web domain. However, social-networking system 160 may determine that Majestic Cat Videos does have a subdomain of the XYZ News web domain, at www.xyznews.com/majesticcat-videos/. Social-networking system 160 may then determine whether any documents in this subdomain have a page ID that matches the particular content item posted to social-networking system 160.

In particular embodiments, determining whether a first document on a first web domain should be synchronized with a second document on a second web domain may be based on a link provided in one of the documents. As an example and not by way of limitation, the first document may be posted on social-networking system 160 by the publishing entity, while the second document is posted on the publishing entity's own website. The publishing entity may include a link to the second document in the first document. Social-networking system 160 may determine that the link added by the publishing entity was to another location where the content item of the first document is being posted, and determine that the first document and the second document (found via the link) should be synchronized.

In particular embodiments, user actions may be synchronized across multiple documents on the same web domain. As an example and not by way of limitation, entity XYZ News may maintain multiple pages on social-networking system 160, such as "XYZ News: Top Stories" and "XYZ News: Sports". Some content items may be posted by XYZ News to both pages, such as a news article about the Super Bowl. In this example, there are two documents that are on a web domain of social-networking system 160 with a common content item. Social-networking system 160 may determine that these two documents on two separate pages correspond to each other, and determine that the interactive features for the two documents should be synchronized. If the same content item is also included in a document posted on an external website (e.g. at www.xyznews.com), and social-networking system 160 determines that the external document also corresponds to the two documents within social-networking system 160, then all three documents may have their interactive features synchronized. In particular embodiments, duplicate copies of the same document and/or the same content item may be published in the same location by an entity. In particular embodiments, the interactive features for both copies of the document and/or content item may also be synchronized to each other and to any other matching documents and/or content items.

Figure 4:
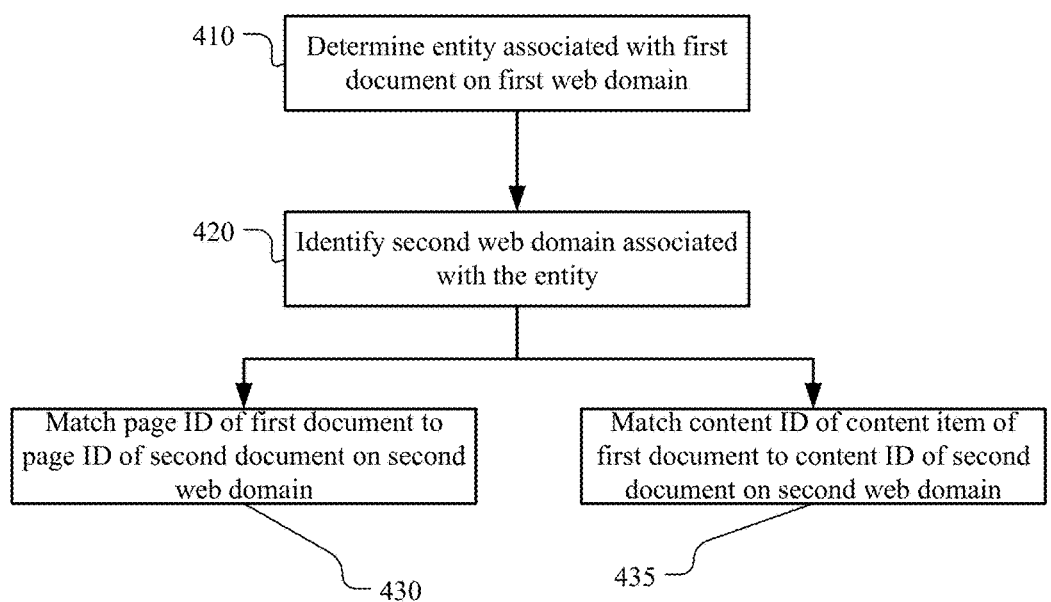
FIG. 4 illustrates an example method for mapping a document on an external web site to a document hosted by the social-networking system.

FIG. 4 illustrates an example method 400 for selecting a second document to synchronize with a first document. The method may begin at step 410, where an entity that is associated with the first document on a first web domain is determined. In particular embodiments, the entity may be a publisher of a content item in the first document. In particular embodiments, the entity may correspond to the first document of the first web domain. As an example and not by way of limitation, the entity may have a dedicated page on social-networking system 160, where the entity may post content to the dedicated page. In this example, either a post on the dedicated page or the dedicated page itself may be the first document, and a web domain of social-networking system 160 may be the first web domain. In particular embodiments, the entity may be associated with the first web domain. As an example and not by way of limitation, the entity may be XYZ News, and the first web domain may be www.xyznews.com, with content being posted by XYZ News onto a first document in www.xyznews.com. At step 420, social-networking system 160 may determine whether the entity is also associated with a second web domain. As an example and not by way of limitation, the entity XYZ News may also correspond to the web domain www.xyznewsblog.org, and publish content on that web domain. In particular embodiments, the second web domain may be a subdomain that corresponds to the entity. As an example and not by way of limitation, a subdomain may be the XYZ News page on social-networking system 160. As another example, a subdomain may be on a third-party website.

The method may then proceed to either step 430 and/or step 435. At step 430, social-networking system 160 may compare a page ID of the first document with a page ID of a second document on the second web domain to determine whether there is a match. In particular embodiments, a page ID may be part of the URL used to access the first document or the second document. In particular embodiments, a page ID may be other identifying information about the first document and the second document. As an example and not by way of limitation, page ID may include metadata corresponding to the first document or the second document which may uniquely identify the document. At step 435, social-networking system 160 may compare a content ID of a content item in the first document with a content ID of a content item in a second document to determine if there is a match. As an example and not by way of limitation, both the first document and the second document may contain an embedded video content file. The video may have unique identifying characteristics or information, such as filename, filesize, bitrate, date created, author, etc. Determining that the video content in the first document and the second document may indicate that the interactive features of the second document should be synchronized with interactive features of the first document, as user posts in either document will be relevant to the same content item. In particular embodiments, the method may use both steps 430 and 435 to select a second document. As an example and not by way of limitation, social-networking system 160 may require that both the page ID for the two documents and the content ID for the two content items must be matched before the interactive features are synchronized. In particular embodiments, the method may select a second document if just one of the steps is satisfied. As an example and not by way of limitation, if a first document and a second document have content items with matching content IDs, social-networking system 160 may synchronize the interactive features of the first document and the second document even if their respective page IDs do not match. In particular embodiments, this requirement of either matching page ID or content ID may be used if a single entity created a particular content item being posted, but multiple entities are actually posting the content item.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for selecting a second document to synchronize with the first document, including the particular steps of the method of FIG. 4, this disclosure contemplates any suitable method for determining that two or more documents correspond to each other including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, social-networking system 160 may determine that a first document in a first web domain corresponds to a second document which is provided through a mobile application. As an example and not by way of limitation, a news article published by XYZ News may be accessible on their website (www.xyznews.com), and also by accessing the XYZ News application on a mobile device. The XYZ News application may include interactive features of social-networking system 160 such as allowing a user to like, share, or comment on a content item or document displayed through the application. In particular embodiments, social-networking system 160 may match a domain name or other entity name associated with the first document, and determine an application ID for the domain or entity that published the content. In particular embodiments, an application ID may be a unique identifier for any entity that shares content on social-networking system 160. A particular application ID may inform social-networking system 160 that the entity in question is a developer/publisher/other entity. Social-networking system 160 may then determine whether any third-party websites include content items having the same application ID. As an example and not by way of limitation, a mobile application for "Majestic Cat Videos" may have a particular application ID associated with the entity Majestic Cat Videos, who also post video content on the website www.xyznews.com/majesticcat-videos, as well as www.metube.com/majesticcatvideos. Social-networking system 160 may determine that since the particular mobile application has an application ID matching the same entity that is posting content items on the external websites, these three sets of documents should be synchronized. In particular embodiments, determining which documents should be synchronized to each other may include comparing the content items, which may also include comparison of any metadata available for a content item. As an example and not by way of limitation, if there are two video files, one on a mobile application and one on an external website associated with the same entity as the mobile application, social-networking system 160 may compare the filename, file size, date created, video size, framerate, or any other information about the video files to determine whether they are matching, which may indicate that the two video files should have synchronized interactive features.

Figures 5A, 5B:
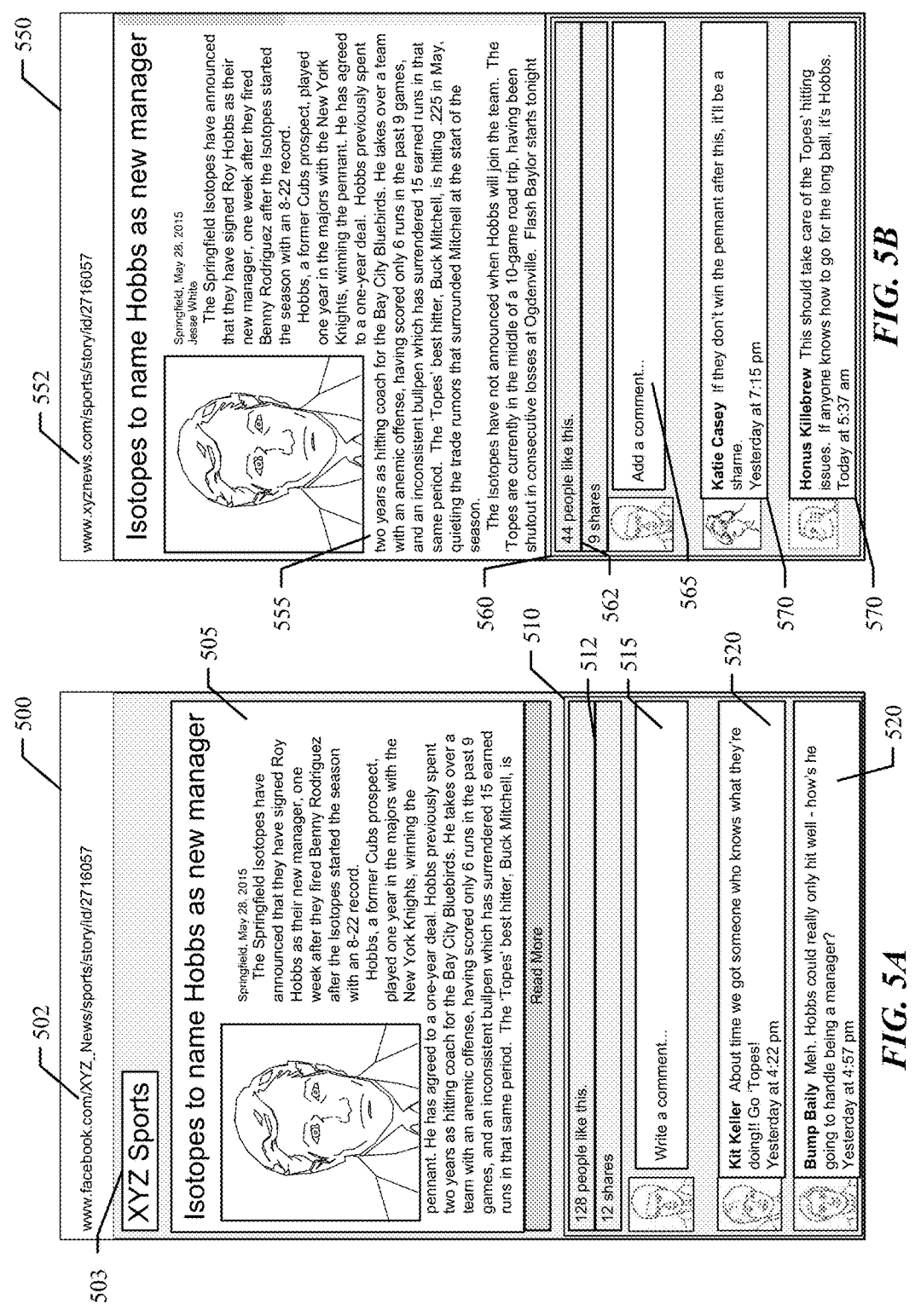

FIGS. 5A and 5B illustrate an example of two documents in two separate web domains with unsynchronized interactive features. In FIG. 5A, a first document 500 is accessible through a first web domain 502 (here, "www.facebook-.com"). First document 500 may be a page 503 dedicated to a particular entity. In the example of FIG. 5A, the entity is "XYZ Sports." First document 500 includes at least one content item 505, in this case a news article with an image. First document 500 also includes an interactive feature 510 which allows a user to further interact with first document 500 or content item 505, or view other users' interactions. As an example and not by way of limitation, a user may view an element 512 indicating how many other users have liked or shared the document, and a user may interact with element 512 to also like or share the document themselves. A user may also be provided with element 515 to provide a user post regarding first document 500. Interactive feature 500 may also include a conversation thread with one or more comments 520 made by other users. In FIG. 5B, a second document 550 has substantially the same elements and features as first document 500. Second document 550 is accessible through a second web domain 552 (here, a subdomain: "www.xyznews.com/sports/"). Content item 555 is identical to content item 505 of first document 500. Interactive features 560 are also provided to a user accessing second document 550. In particular embodiments, interactive features 560 may be linked with interactions on social-networking system 160. As an example and not by way of limitation, interactive features 560 may be implemented on second document 550 using a widget or plugin that allows social-networking functions to be implemented on a web site external to the social network. Interactive features 560 also include elements 562 indicating actions of other users; element 565 which permits a user to post a comment to second document 550; and a conversation thread of other user comments 570. In the example of FIGS. 5A and 5B, it may be noted that because interactive features 510 and 560 are not synchronized, the information and content shown to a user on first document 500 is different from what is shown on second document 550. The number of likes and shares in elements 512 and 562 may be different, and the comments 520 may be different from comments 570.

In particular embodiments, additional privacy settings may be implemented for user interactions with synchronized interactive features to control when a particular user action is synchronized across multiple web domains. As an example and not by way of limitation, when a user posts a comment in an article provided on www.xyznews.com, the user may be presented with a pop-up notification window that informs the user that their comment may also be posted on a corresponding XYZ News page on social-networking system 160. In particular embodiments, social-networking system 160 may require the user to affirmatively assent to sharing their user comment before proceeding with synchronization of the user comment to other web domains. In particular embodiments, a particular user may set a default privacy setting for their account that enables or disables synchronization of any user action (e.g. likes, shares, comments) to all corresponding documents in any web domain. In particular embodiments, a default setting for synchronizing user actions may be to restrict synchronization (requiring users to "opt-in" to synchronization). In particular embodiments, a default setting for synchronizing user actions may be to allow synchronization (requiring users to "opt-out" of synchronization). In particular embodiments, a user may specify a banned list of web pages or web domains which will not be synchronized. As an example and not by way of limitation, a user may indicate via a privacy setting that web domain www.sportsfans.com is not to be synchronized with the user's other activities involving social-networking system 160. In this example, there may be a video that is posted by Sports Fans to: (1) the Sports Fans page of social-networking system 160; (2) the www.sportsfans.com website; and (3) the www.xyznews.com website. The user may view the video on www.xyznews.com and post a comment. That comment may be synchronized to the Sports Fan page of social-networking system 160, but will not by synchronized to www.sportsfans.com. In particular embodiments, a user may indicate that user actions from a particular web domain are not to be synchronized to other documents in other web domains. As an example and not by way of limitation, in the example above, if the restriction is on synchronizing user actions from the www.xyznews.com website, then the user's comment will not be synchronized to the other web domains, even if none of the web domains are restricted.

FIGS. 6A and 6B illustrate an example of two documents with synchronized interactive features. The changes between the documents displayed in FIGS. 6A and 6B when compared to FIGS. 5A and 5B are the interactive features 610 in FIG. 6A and interactive features 660 in FIG. 6B. For both interactive features, element 612 now lists the total number of likes and shares of either first document 500 or second document 550. In the example of FIG. 6A, a user has input a new comment 615 within interactive features 610. Comment 615 is made in response to the first comment 620 displayed. In particular embodiments, a user may select another element 617 which indicates whether the user has given permission to synchronize the user's post to other locations where content item 505 has been posted. In the example of FIG. 6A, the user has checked the box of element 617 indicating that his comment will also be posted at another web domain.

In the example of FIG. 6B, the user comment 615 has been synchronized to interactive features 660 of second document 550. User comment 615 appears in FIG. 6B as comment 625. The conversation thread of user comments 620 displayed in interactive features 660 is arranged so that the user comment 620 which comment 625 is in reply to appears just above comment 625, even though the comments 620 and 625 in interactive feature 660 are then no longer presented in a strict chronological order. Interactive features 660 may also include element 612 for displaying a total number of likes and shares of the first document or the second document, and the user may post another user comment using element 615. In particular embodiments, the user may also indicate via element 618 that any posts made by the user in second document 550 should be synchronized to the first document.

In particular embodiments, user interactions that can be synchronized across multiple documents may be tailored to specific users or groups of users, based on user interactions that involve those specific users or groups of users. As an example and not by way of limitation, a first user may personally share a content item that is published on an external web page, or a content item that is published on a page of social-networking system 160. The first user may additionally comment on the content item as part of the share. The shared content item may be accessible to friends and/or acquaintances of the first user. In particular embodiments, the shared content item may include the comment of the first user and any subsequent comments on the first user's shared content item, as well as any other comments that have been posted on other public posts of the content item. As an example and not by way of limitation, if the first user is sharing a content item that has also been publicly posted as a second document on an external web page, a second user viewing the first user's shared content item may see the first user's comment and any subsequent comments to the first user's comment, as well as any comments on the second document. In particular embodiments, other individual shares of the content item would not be synchronized. As an example and not by way of limitation, if a third user also shares the same content item, and posts by the third user are not accessible to the second user, then the second user would not be able to view any comments on the third user's shared content item. As another example, if the third user's posts are accessible to the second user, then the second user may view either the first user's shared post or the third user's shared post, and the conversation thread for each post may include: comments on the first user's shared post; comments on the third user's shared post; and any comments on the public post.

In particular embodiments, if a particular user submits a comment on a public post of a content item shared by an entity, the comment may appear only on the entity's social network page (or alternatively, an external web page) where the content item was posted, rather than appearing on the particular user's user page or newsfeed. In particular embodiments, if a particular user submits a comment on a public post of a content item shared by an entity, social-networking system 160 may generate a story or activity feed regarding the comment, which may appear on a newsfeed for the particular user's friends. In particular embodiments, if a friend of the particular user subsequently selects the story or activity feed, the friend may be directed to the content item on the entity's social network page (or on an external web page), where the friend can view the particular user's comment as well as all other comments regarding the content item. In particular embodiments, the friend may post a reply comment or any other type of response to the particular user's comment, either directly through their newsfeed, or through the content item posted on the entity's social network page or external web page. In particular embodiments, the particular user may subsequently be notified of the friend's reply or response on the particular user's own newsfeed, whereupon the particular user may select the notification to be taken to the social network page or external web page to further answer to the friend's reply.

In particular embodiments, synchronized conversation threads may include conversations on a messaging application of social-networking system 160. As an example and not by way of limitation, user Alice may initiate a group chat with users Bob and Charlie on a messaging application of social-networking system 160. As part of the group chat, Alice may send a link to a first content item to Bob and Charlie. The link to the first content item may be a link to a document on social-networking system 160, or may be a document on an external web page. In particular embodiments, social-networking system 160 may synchronize the messaging application messages into the interactive features for the first content item in its original location. As an example and not by way of limitation, after the group chat has ended, Bob may go to the location of the first content item, and view comments posted by other users to the first content item, as well as the messages sent by Alice, Bob, or Charlie in response to the link sent by Alice. In particular embodiments, the messages from the messaging application may only be accessible by the participants of the group chat. In particular embodiments, the user who sent the link in the messaging application may specify who can view the messages as part of the interactive features in the linked content item. As an example and not by way of limitation, continuing the example above, Alice may specify that Bob is able to view the group chat messages when Bob accesses the first content item. However, Charlie may not be able to view the group chat messages when he accesses the first content item, if Alice has not specified that Charlie should have access.

In particular embodiments, social-networking system 160 may recognize that comments from a particular group of users may be particularly relevant to the conversation thread, and isolate the comments from the particular group of users. As an example and not by way of limitation, for a posted content item being a music video by a particular band, comments made by band members may be of greater relevance than comments made by the fans or viewers. In particular embodiments, social-networking system 160 may identify the group of users (here the band members), and make their comments and their conversation thread a "closed" conversation within the larger conversation thread. In particular embodiments, the conversation thread by the band members is publicly viewable, but other users may not participate in this particular conversation thread, and comments by other users are simply placed in the general conversation thread for the music video. In particular embodiments, public users may still be able to reply to comments made by the band members, but in the conversation thread as displayed to all users, the comments made by the band members may be isolated or otherwise highlighted, while the replies by other users are reduced in prominence. In particular embodiments, social-networking system 160 may select a particular group of users based on information about each user in the particular group that may indicate their comments are more relevant. As an example and not by way of limitation, if the content item is a news article about a flood in Houston, Tex., social-networking system 160 may determine that comments by users who reside in Houston or are currently in Houston may be more relevant, and isolate or otherwise highlight the conversation thread involving Houston users. In particular embodiments, social-networking system 160 may highlight the conversation thread with the particular group of users, and indicate that this conversation thread has greater importance or relevance.

FIGS. 7A and 7B illustrate an example of synchronized conversation threads (with no separate content item being posted) including closed conversation portions. In FIGS. 7A and 7B, each document 700 and 750 may comprise a web page located at URLs 702 and 752, respectively. Documents 700 and 750 may each include a conversation thread located with a topic prompt, 703 and 753, respectively. In this example, social-networking system 160 may determine that the two topic prompts are very similar, and determine that the conversations threads of document 700 and document 750 should be synchronized. In the example of FIGS. 7A and 7B, user comments 721, 722, 731, and 732 in document 700 may be synchronized with user comments 771, 772, 781, and 782 in document 750. In particular embodiments, documents 700 and 750 may share an element 712 which indicates a number of user actions for the synchronized conversation threads. In particular embodiments, user comments may include media content such as images, video files, audio files, stickers, or any other type of content that may be displayed. In the example of FIG. 7A, user comment 731 includes an image, which is also displayed in the synchronized user comment 781. In particular embodiments, if the image of user comment 731 is subsequently modified or deleted, social-networking system 160 may determine that the image should also be removed from user comment 781.

In particular embodiments, if a particular user comment was not entered at the document being displayed, but at another location, that information may be displayed to the user. As an example and not by way of limitation, in FIGS. 7A and 7B, user comments 721/771 and 732/782 were input by their respective users in document 750, while user comments 722/772 and 731/781 were input by their respective users in document 700. Therefore, in FIG. 7A with document 700, user comments 721 and 732 may include an indication that these comments were made in document 750, and in FIG. 7B with document 750, user comments 772 and 781 may include an indication that these comments were made in document 700.

In particular embodiments, part of a conversation thread may include a closed conversation by a particular group of users. In the example of FIG. 7A, where the conversation thread is directed to "the greatest movie of all time", the conversation thread of document 700 includes a closed conversation group 720. In particular embodiments, the conversation thread may indicate why a conversation is closed. In the example of FIG. 7A, the closed conversation group indicator 720 may display that the closed group includes comments from individuals in the film industry, who may be presumed to have special knowledge for the topic. Therefore, user comments 721 and 722 may be made by users within that closed group—in the example of FIG. 7A, user comment 721 is provided by a film critic, and user comment 722 is provided by a film director/producer. User comments 731 and 732, not being provided by users in the closed group, may be placed in the "open conversation" group 730. All users may view the closed conversation thread 720, but only the users in the closed group may contribute comments. In the example of FIG. 7B, the closed conversation thread 720 of FIG. 7A may be synchronized with closed conversation thread 770, and open conversation thread 730 may be synchronized with open conversation thread 780. In particular embodiments, social-networking system 160 may determine that only one of the conversation threads should be synchronized. As an example and not by way of limitation, social-networking system 160 may determine that for documents 700 and 750, the open conversation threads should not be synchronized in an attempt to foster two different conversations, but that the closed conversation threads 720 and 770 should be synchronized so that the open conversations may be based from the same seed comments by the closed group of users.

In particular embodiments, for a set of synchronized interactive features for multiple document on separate web domains, the source of each user interaction with one of the documents may be recorded. As an example and not by way of limitation, social-networking system 160 may determine how many comments were posted from a first web domain (e.g. the page on social-networking system 160), versus the number of comments posted from users accessing the document or content item through a second web domain, e.g. an external website. The number of likes, shares, or any other user actions from each web domain may also be determined. This information may be used for entities publishing content items at multiple locations in order to determine how many users (or the proportion of users that) interact with a particular content item from a particular source. As an example and not by way of limitation, if an entity determines that more users are commenting/interacting with their content through their own website, and less through their social-networking page, this determination may indicate that fewer users are visiting the social-networking page, and the entity may make efforts to steer users to the social-networking page. In particular embodiments, this information may also help inform an entity of how popular a content item provided by the entity is on different web domains. As an example and not by way of limitation, an entity may be publishing content items on a page of a social network, as well as publishing the same content items on an external website catering to a particular demographic. By recording the number of user interactions at each location of the content item, the entity may determine whether a content item is more popular with the general population of the social network (e.g. the average demographic for users of the social network), or if it is more popular with the average demographic of the users of the website. In particular embodiments, the data on the number or proportions of user interactions in one web domain versus another web domain may not be accessible to individual users of social-networking system 160.

Systems and Methods

Figure 8:
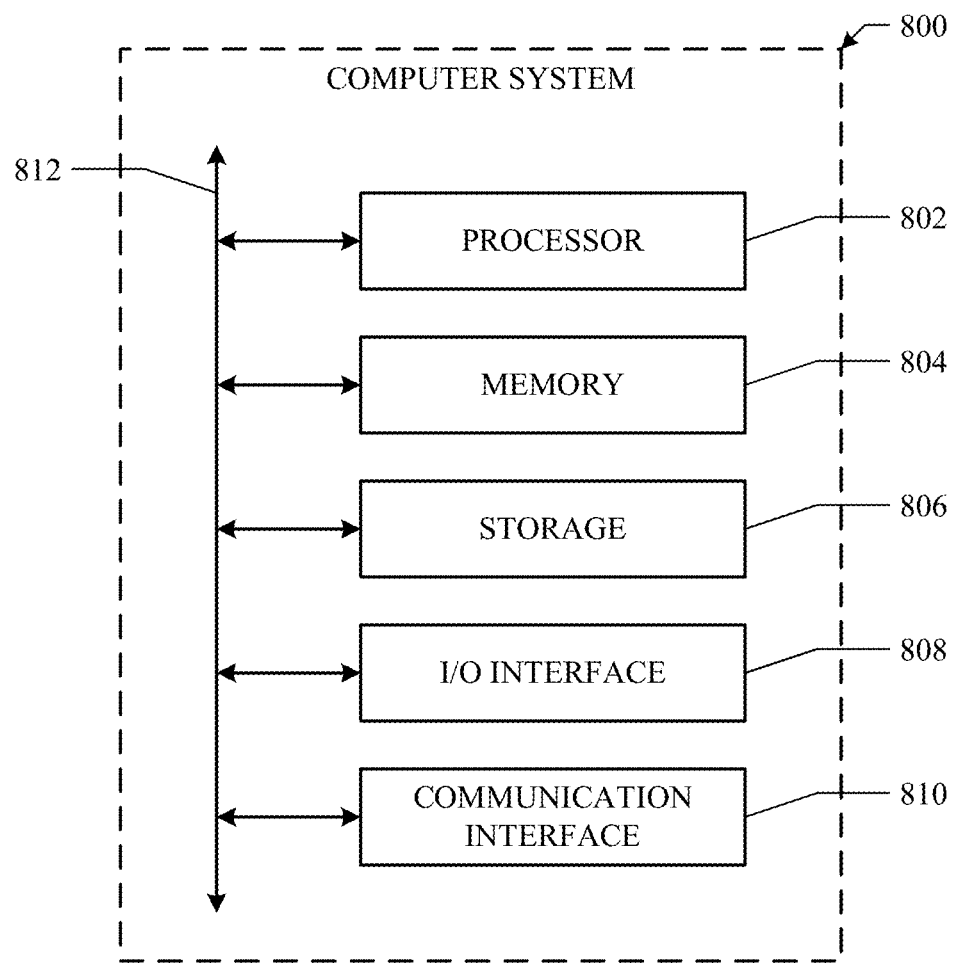
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
 by one or more computing devices of a social-networking system, receiving a reference to a first document, wherein the first document:
  comprises a content item and a first interactive feature for user posts, wherein the first interactive feature is displayed as a conversation thread;
  is associated with an entity; and
  is provided from a first web domain;
 by the one or more computing devices, selecting a second document that corresponds to the first document, wherein the second document:
  shares a common content item with the first document;
  comprises a second interactive feature for user posts, wherein the second interactive feature is displayed as a conversation thread;
  is provided from a second web domain; and
  is associated with the entity;
 by the one or more computing devices, receiving a user post related to the content item, the user post being submitted in connection with the first or the second document; and
 by the one or more computing devices, updating the first interactive feature and the second interactive feature with the user post, wherein the updating comprises:

synchronizing the first interactive feature and the second interactive feature at the same time; and
automating a synchronization of a moderation of the user post in connection with both the first and the second documents based on a set of banned words or character strings, wherein automating the synchronization of the moderation comprises:
filtering out one or more words of the user post in connection with the first document based on a first moderation rule of the first web domain; and
filtering out one or more words of the user post in connection with the second document based on a second moderation rule of the second web domain.

2. The method of claim 1, wherein the first or second document is located in:
a web page external to the social-networking system; or
an application external to the social-networking system.

3. The method of claim 1, wherein the first or second document is located in:
a web page associated with the social-networking system; or
an application associated with the social-networking system.

4. The method of claim 1, wherein both the first web domain and the second web domain are external to the social-networking system.

5. The method of claim 1, further comprising, in response to receiving the user post, sending a notification to a user associated with the user post that the user post will be synchronized between the conversation thread of the first and second documents.

6. The method of claim 5, further comprising:
receiving an indication from the user that the user post should not be shared in any other document; and
in response to receiving the indication, restricting the user post to the conversation thread of the document from which the user post was received.

7. The method of claim 1, wherein selecting the second document comprises:
for the entity associated with the first document on a first web domain, identifying a second web domain that is associated with the entity; and
selecting a second document on the second web domain, by:
matching a page ID of the first document with a page ID of the second document; or
matching a content ID of the content item of the first document with a content ID of the content item of the second document.

8. The method of claim 7, wherein the second web domain that is associated with the entity is a subdomain.

9. The method of claim 1, wherein selecting the second document comprises:
for a first document shared by an entity associated with the social-networking system, determining an application ID corresponding to the entity; and
determining whether the second document is shared by an entity corresponding to the application ID.

10. The method of claim 1, wherein the content item comprises:
text;
video content;
one or more images;
audio content; or
one or more links.

11. The method of claim 1, wherein the user posts comprise one or more of:
a comment;
a like;
an image;
a sticker;
an ideogram;
video content;
audio content;
a frame with embedded content; or
a link.

12. The method of claim 1, further comprising:
determining one or more third documents corresponding to the first and second documents, wherein the third documents:
share common content with the first document and the second document;
comprise a third interactive feature for user posts, wherein the third interactive feature is displayed as a conversation thread; and
are associated with the entity; and
synchronizing the conversation threads of the third documents with the conversation threads of the first document and the second document.

13. The method of claim 1, wherein a content item comprises an interactive feature comprising a conversation thread of one or more user comments.

14. The method of claim 13, wherein synchronizing the first interactive feature and the second interactive feature comprises synchronizing the content items of the first document and the second document at the same time.

15. The method of claim 1, wherein the entity is a publisher of the content item.

16. The method of claim 1, further comprising:
determining that the user post is made in reply to a previous user post in the conversation thread; and
synchronizing the conversation threads in both the first interactive feature and the second interactive feature such that the user post is displayed in association with the previous user post.

17. The method of claim 1, further comprising:
receiving input by a moderator to edit a particular user post in the first interactive feature or second interactive feature; and
editing the particular user post in the conversation threads associated with the first interactive feature and the second interactive feature.

18. The method of claim 1, further comprising, for a particular conversation thread:
identifying one or more user posts corresponding to one or more users in a particular user group;
isolating the one or more user posts in the conversation thread; and
restricting further user posts corresponding to the one or more user posts to users in the particular user group.

19. A system comprising:
one or more processors; and
a memory coupled to the processors comprising instructions executable by the processors, the processors being operable when executing the instructions to:
receive a reference to a first document, wherein the first document:
comprises a content item and a first interactive feature for user posts, wherein the first interactive feature is displayed as a conversation thread;
is associated with an entity; and
is provided from a first web domain;

select a second document that corresponds to the first document, wherein the second document:
  shares a common content item with the first document;
  comprises a second interactive feature for user posts, wherein the second interactive feature is displayed as a conversation thread;
  is provided from a second web domain; and
  is associated with the entity;
receive a user post related to the content item, the user post being submitted in connection with the first or the second document; and
update the first interactive feature and the second interactive feature with the user post, wherein the update comprises:
  synchronizing the first interactive feature and the second interactive feature at the same time; and
  automating a synchronization of a moderation of the user post in connection with both the first and the second documents based on a set of banned words or character strings, wherein automating the synchronization of the moderation comprises:
    filtering out one or more words of the user post in connection with the first document based on a first moderation rule of the first web domain; and
    filtering out one or more words of the user post in connection with the second document based on a second moderation rule of the second web domain.

20. One or more computer-readable non-transitory storage media embodying software that is operable when executed to:
receive a reference to a first document, wherein the first document:
  comprises a content item and a first interactive feature for user posts, wherein the first interactive feature is displayed as a conversation thread;
  is associated with an entity; and
  is provided from a first web domain;
select a second document that corresponds to the first document, wherein the second document:
  shares a common content item with the first document;
  comprises a second interactive feature for user posts, wherein the second interactive feature is displayed as a conversation thread;
  is provided from a second web domain; and
  is associated with the entity;
receive a user post related to the content item, the user post being submitted in connection with the first or the second document; and
update the first interactive feature and the second interactive feature with the user post, wherein the update comprises:
  synchronizing the first interactive feature and the second interactive feature at the same time; and
  automating a synchronization of a moderation of the user post in connection with both the first and the second documents based on a set of banned words or character strings, wherein automating the synchronization of the moderation comprises:
    filtering out one or more words of the user post in connection with the first document based on a first moderation rule of the first web domain; and
    filtering out one or more words of the user post in connection with the second document based on a second moderation rule of the second web domain.

* * * * *